United States Patent
Leymann et al.

(10) Patent No.: US 6,681,251 B1
(45) Date of Patent: Jan. 20, 2004

(54) WORKLOAD BALANCING IN CLUSTERED APPLICATION SERVERS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 09/605,590

(22) Filed: Jun. 28, 2000

(30) Foreign Application Priority Data

Nov. 18, 1999 (EP) .............................................. 99122913

(51) Int. Cl.[7] .......................................... G06F 15/173
(52) U.S. Cl. ........................ 709/226; 709/105; 709/203; 709/228; 709/102
(58) Field of Search ................................ 709/226, 105, 709/203, 228, 102; 705/235

(56) References Cited

U.S. PATENT DOCUMENTS

| | | | | |
|---|---|---|---|---|
| 5,539,883 A | * | 7/1996 | Allon et al. ................. | 709/105 |
| 5,987,502 A | * | 11/1999 | Banks et al. ................. | 709/203 |
| 6,014,700 A | * | 1/2000 | Bainbridge et al. ......... | 709/226 |
| 6,067,580 A | * | 5/2000 | Aman et al. ................. | 709/330 |
| 6,141,759 A | * | 10/2000 | Braddy ........................ | 713/201 |
| 6,192,389 B1 | * | 2/2001 | Ault et al. ................... | 709/101 |
| 6,202,080 B1 | * | 3/2001 | Lu et al. ..................... | 709/105 |
| 6,327,622 B1 | * | 12/2001 | Jindal et al. ................. | 709/228 |
| 6,351,775 B1 | * | 2/2002 | Yu ............................... | 709/238 |
| 6,438,652 B1 | * | 8/2002 | Jordan et al. ................ | 711/120 |
| 6,442,564 B1 | * | 8/2002 | Frey et al. .............. | 707/103 R |
| 6,571,288 B1 | * | 5/2003 | Sarukkai ...................... | 709/226 |

* cited by examiner

Primary Examiner—Zarni Maung
Assistant Examiner—Sahera Halim
(74) Attorney, Agent, or Firm—Jerry W. Herndon; Carstens, Yee & Cahoon

(57) ABSTRACT

The invention relates to a method and means of workload balancing for a multitude of applications servers. The method comprises a first-step, wherein an application client sends an application request to a request queue of a dispatcher. In a second step the dispatcher is extracting an application request from said request queue. Within the second step the dispatcher selects a certain one of the application servers to which the extracted application request is to be sent to based on a table. The table is administered by the dispatcher and the table comprises an indication of the workload of the application servers. Also within the second step the dispatcher administers the table according to the selection and the dispatcher sends the extracted application request to said certain application server. The method comprises a third step, wherein an application server after processing an application request returns to the dispatcher a response comprising an indication of its current workload. In a fourth step the dispatcher is administering the table according to said response.

15 Claims, 3 Drawing Sheets

WORKLOAD BALANCING IN CLUSTERED APPLICATION SERVERS

BACKGROUND OF THE INVENTION

Enterprises depend on the availability of the systems supporting their day to day operation. A system is called available if it is up and running and is producing correct results. Thus, in a narrow sense, availability of a system is the fraction of time it is available. Ideally, the availability of a system is 1.

Availability of a certain system or application has at least two aspects: in a first, narrow significance it relates to the question, whether a certain system is active at all providing its services; in a second, wider significance it relates to the question, whether this service is provided in a timely fashion offering a sufficient responsiveness.

One fundamental mechanism to improve availability is based on "redundancy": The availability of hardware is improved by building clusters of machines and the availability of software is improved by running the same software in multiple address spaces. With the advent of distributed systems techniques have been invented which use two or more address spaces on different machines running the same software to improve availability (often called active replication). Further details on these aspects may be found in S. Mullender, "Distributed Systems", ACM Press, 1993. In using two or more address spaces on the same machine running the same software which gets its request from a shared input queue the technique of warm backups is generalized by the hot pool technique. To improve availability in the above sense of such a multitude of application servers effective workload balancing mechanisms are essential.

Workload management is an area of technology within Transaction Processing monitors (TP monitors). TP monitors have been invented more than three decades ago to make effective use of expensive system resources (J. Gray and A. Reuter, "Transaction processing: Concepts and Techniques", San Mateo, Calif.: Morgan Kaufmann 1993): Ever increasing numbers of users had to be supported by a system, and it turned out that native operating system functionality did not suffice to allow this. A TP monitor as a layer on top of the operating system manages system resources at a much finer granularity, assigns them with care, only if needed and only for the duration needed. As a result, for one and the same machine and operating system, a given application can support orders of magnitudes more users when implemented in a TP monitor than when implemented based on native operating system features. The very complex and sophisticated TP monitor technology is primarily limited to a certain server only and thus does not solve the availability problem of a distributed network of application servers.

With the advent of distributed systems like for instance commodity cluster environments, i.e. environments which are composed out of relatively cheap hardware (refer for instance to G. F. Pfister, In search of clusters—2nd edition, Prentice Hall PTR, 1998), the problem of workload management arose on a larger, distributed scale. In such environments, the service providing software components are simply replicated on multiple machines to ensure scalability. But this requires a mechanism to assign service requests to the various service providers ensuring the effective exploitation of the cluster resources. As a consequence, implementation of the distributed system has to deal with similar problems as traditional TP monitors did before (this is one of the reasons why such systems are considered as "TP monitor like systems" today).

One approach to deal with the problem of workload balancing within a cluster of multiple servers is being based on the idea that all application servers on the different servers share the same input queue. In general, this requires that (a) all application servers run the same message queuing system and (b) the message queuing system supports the remote access to queues. Actually this approach does not represent any workload management decision at all. The common input queue is exploited only for guaranteeing an "atomic" access to the individual messages (which comprise the application requests); i.e. the first application server which successfully retrieved an application request will be responsible for processing it. The common message queuing system has to spend a significant amount of processing effort for synchronization of the accesses of the various application servers. The larger the network of connected application servers will be, the larger is this synchronization effort which finally will become the processing bottleneck.

In another approach to the problem, when the application client connects to the cluster, it first connects to a particular application server. The application server knows the current workload on the other servers, indicates to the client which application server to use, and the client then connects to the indicated server. This type of workload balancing is rather rudimentary, since it balances only on a user level and not on a request level; moreover this is a static type of workload balancing as it depends on the workload situation of a certain point in time only at logon time. One example of this type of approach is taught by C. R. Gehr et al., "Dynamic Server Switching for Maximum Server Availability and Load Balancing", U.S. Pat. No. 5,828,847 according to which the application server to be used by the application client is stored in a profile. Gehr teaches a dynamic server switching system relating to the narrow significance of availability as defined above. The dynamic server switching system maintains a static and predefined list (a kind of profile) in each client which identifies the primary server for that client and the preferred communication method as well as a hierarchy of successively secondary servers and communication method pairs. In the event that the client does not have requests served by the designated primary server or the designated communication method, the system traverses the list to ascertain the identity of the first available alternate server-communication method pair. This system enables a client to redirect requests from an unresponsive server to a predefined alternate server. In this manner, the system provides a reactive server switching for service availability.

In spite of improvements of availability in the narrow sense defined above this teaching suffers from several shortcomings. Gehr's teaching provides a reactive response only in case a primary server could not be reached at all. There are no proactive elements which prevent that a client requests service from a non-responsive server. As the list of primary and alternate servers is statically predefined there may be situations in which no server could be found at all or in which a server is found not before several non-responsive alternate servers have been tested. Moreover Gehr's teaching does not allow for a dynamic workload balancing improving the availability in the wider sense, i.e. the responsiveness. According to Gehr, different clients might be controlled by different lists of servers, which allow for a rudimentary and static workload balancing as different clients might send their requests to different servers. In a highly dynamic, worldwide operating network situation where clients and servers permanently enter or leave the network and where the access pattern to the servers may change from one moment to the next, Gehr's teaching to improve the responsiveness is not adequate.

Despite of all of this progress, further improvements are urgently required supporting enterprises in increasing the availability of their applications and allowing for instance for electronic business on a 7 (days) * 24 (hour) basis; due to the ubiquity of worldwide computer networks at any point in time somebody might have interest in accessing a certain application server.

OBJECTS OF THE INVENTION

The invention is based on the object of providing an improved method and means for workload management within a multitude of application servers providing services to a multitude of application clients.

It is a further object of the invention to increase the availability by providing a technology, which is highly responsive to dynamic changes of the workload of individual application servers within the network.

SUMMARY OF THE INVENTION

The objects of the invention are solved by the independent claims. Further advantageous arrangements and embodiments of the invention are set forth in the respective subclaims.

The invention relates to a method and system of workload balancing for a multitude of applications servers which comprises a first-step, wherein an application client sends an application request to a request queue of a dispatcher. In a second step the dispatcher is extracting an application request from request queue. Within the second step the dispatcher selects a certain one of the application servers to which the extracted application request is to be sent based on a table. The table is administered by the dispatcher and the table comprises an indication of the workload of the application servers. Also within the second step the dispatcher administers the table according to the selection and the dispatcher sends the extracted application request to a certain application server. The method comprises a third step, wherein an application server after processing an application request returns to the dispatcher a response comprising an indication of its current workload. In a fourth step the dispatcher is administering the table according to the response.

The proposed technology improves the workload balancing within a multitude of application servers providing services to a multitude of application clients. At the same time the availability of the application servers is improved. Through administration of a table storing indications of the workload of the application servers a dynamic technique and ongoing process is suggested being highly responsive to dynamic network situation where clients permanently enter or leave the network and where the access pattern to the servers may change from one moment to the next. Complicated or due to its sheer complexity, monumentous administration efforts to associate application clients with application servers are completely avoided. By introducing a dispatcher and teaching that the dispatcher is executing the load-balancing decisions, a significant processing burden is removed from the servers, where according to the state of the art the workload balancing decisions would be performed and which typically build the primary bottleneck for processing resources. Moreover the application clients, which in most cases are short on resources, have not be involved in the workload balancing processing.

DETAILED DESCRIPTION OF THE PREFERRED EMBODIMENT

The present invention can be realized in hardware, software, or a combination of hardware and software. Any kind of computer system or other apparatus adapted for carrying out the methods described herein is applicable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein and which, when loaded in a computer system, is able to carry out these methods.

Computer program means or a computer program in the present context mean any expression, in any language, code or notation, of a set of instructions intended to cause a system having an information processing capability to perform a particular function either directly or after either or both of the following a) conversion to another language, code or notation; b) reproduction in a different material form.

If the current specification is referring to an application it may be a computer program of any nature not limited to any specific type or implementation. The terms application client and application server have to be understood from a logical point of view only relating to some type of "instance". These terms do not distinguish necessarily different address space or even different computer systems.

The current invention is assuming a certain communication path between application client and application server; this does not mean that the invention is limited to a certain communication paradigm like the message-based communication paradigm.

Enterprises depend on the availability of the systems supporting their day to day operation. A system is called available if it is up and running and is producing correct results. In a narrow sense the availability of a system is the fraction of time it is available. In a second, wider sense availability relates to the question, whether an application service is provided in a timely fashion offering a sufficient responsiveness.

Figure 1:
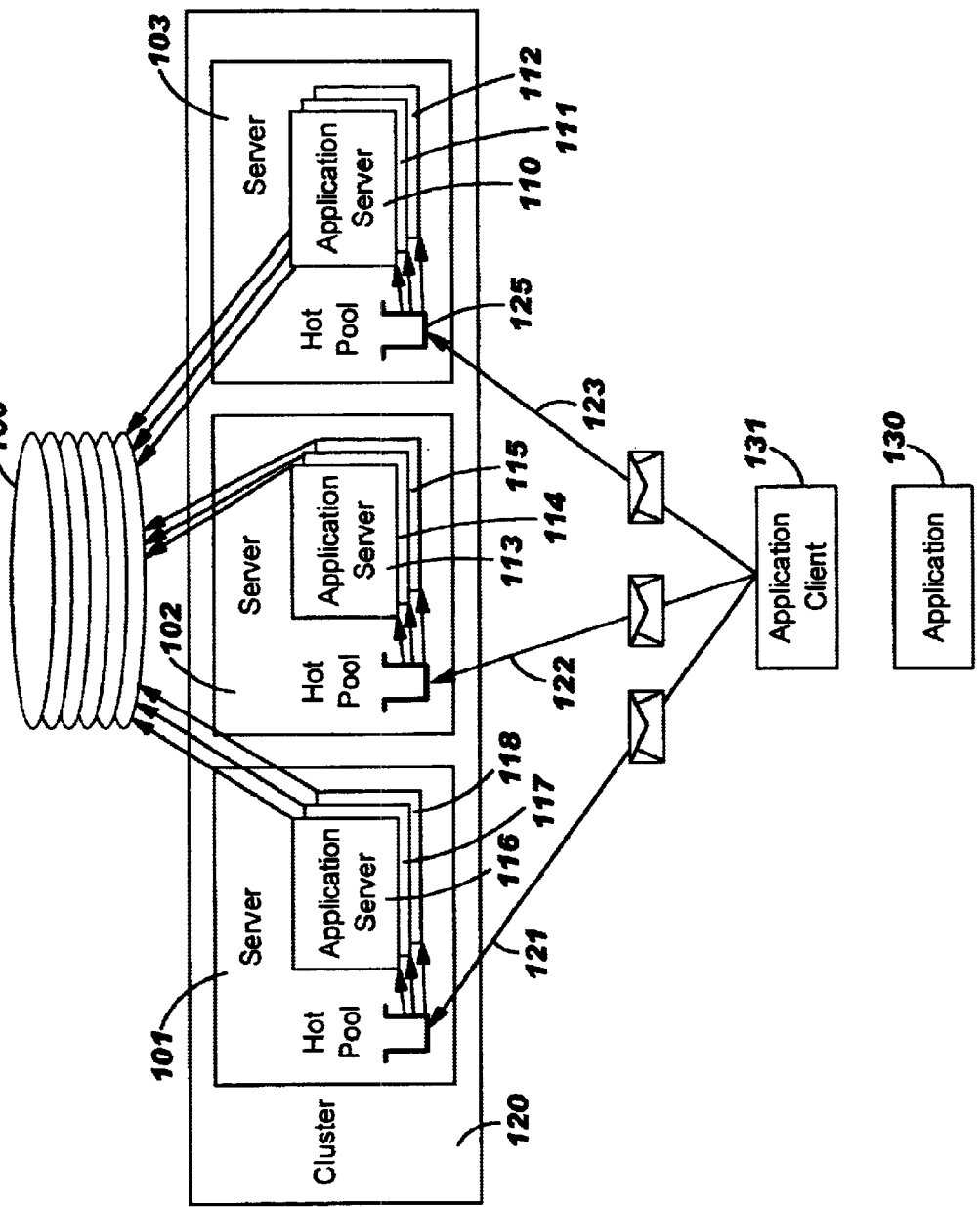
FIG. 1 is a diagram reflecting the concepts of an application server, a hot pool, an application cluster and an application client.

In specific the current invention is relating to environments called "application clusters" based on the following concepts which are also depicted in FIG. 1:

An application server (110, 111 or 112) is an executable implementing a collection of related services, for instance including access to some shared remote database (100). A hot pool (110, 111, 112) is a collection of address spaces each of which runs the same application server and each of these application servers receive requests from an input queue (125), which is shared between the hot pool members. A server machine (101, 102 or 103) is a certain physical machine which hosts a hot pool of application servers. An application cluster (120) is a collection of servers which fail independently and each server machine hosts a hot pool of application servers of the same kind.

Applications (130) request services from application servers via application clients. An application client (131) is an executable which runs on the same machine as the application and which communicates with a server on behalf of the application. If the communication between the application client and a server is based on (asynchronous) reliable message exchange, the application server is said to be message based. In what follows we do assume message based communication between application clients and application servers; of course the invention is not limited to the message based communication paradigm as other paradigms may be used instead. Consequently, an application client requests the performance of a certain service by sending a corresponding message into the input queue of a hot pool of associated application servers on a particular machine.

Traditional workload management is often server-centric and very sophisticated, thus, hard to implement: It takes the particular environment into account, i.e. it is often geared towards the underlying operating system or even hardware environment. Thus, the corresponding components and even the basic concepts are not portable. These server-centric approaches do not solve the availability problem of a distributed network of application servers. These "TP monitor like systems" are much too complicated to develop as well as to administer. Moreover they themselves consume a significant amount of processing resources.

In the case of a single server, workload balancing for the application server hot pool is achieved by all members of the hot pool accessing the same shared queue. That means, all members share their work. In the case of a cluster, workload balancing now must be done for the various servers in the cluster.

As the basic approach, the current invention is starting from the observation that in application cluster environments a much less sophisticated workload management will suffice because the used machine resources (commodity clusters) are usually much cheaper and thus, a request distribution which is to a certain degree uneven (or sub optimal) can be tolerated.

Without workload management performed by the system itself, each client submits requests to a predefined server machine, i.e. an administrator must assign a target machine to each client: This is a cumbersome administrative task, typically resulting in a bad resource exploitation. A typical example of this category is the teaching of Gehr et al. as discussed above.

Furthermore, such non-dynamic approaches are inadequate in a highly dynamic network situation where clients permanently enter or leave the network and where the access pattern to the servers may change from one moment to the next.

A desired solution to these problems should therefore provide a proactive technology which is responsive to sudden changes of the access pattern of the multitude of application clients and which provide a less centralized decisions process for the balancing problem.

Figure 2:
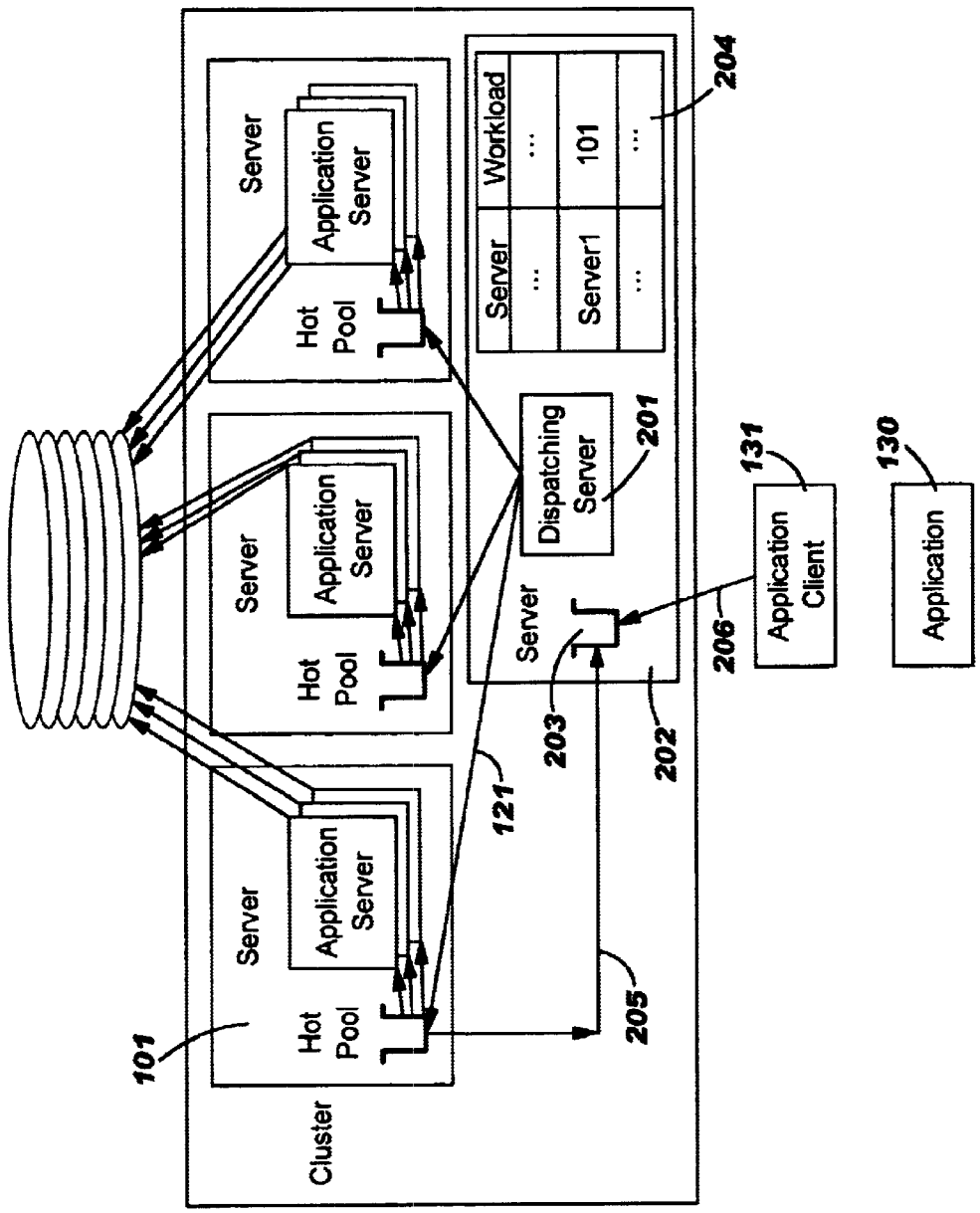
FIG. 2 visualizes the proposed solution according the current invention introducing a dispatching server for performing routing decisions based on workload balancing decisions.

The proposed solution according to the current invention is described referring to FIG. 2 and is being based on the introduction of a "dispatching server" or "dispatcher" for short.

Workload balancing for message-based (of course other communication paradigms could be used instead) clustered application servers can be performed by using a system structure that implements the notion of a dispatching server or a dispatcher (201). A dispatcher is a method of distributing work requests to a number of services. The purpose of the dispatcher is to distribute the requests in such a way that exploitation of resources by the services are improved. A typical example of a dispatcher is used in web servers where a router calls the dispatcher which then distributes the work to the servers doing the actual work. But in addition to that, the current invention suggests that the routing is based on a workload balancing decision.

FIG. 2 shows the overall system structure of a message-based clustered application server that uses a dispatcher (201) running on a dedicated server (202). When a request is submitted by an application (130) via the application programming interface, a message is inserted into the input queue (203) of the dispatcher; this input queue or request queue represents a first port of the dispatcher. The dispatcher selects a certain one of the application servers based on a workload balancing decision and then sends over a second port (121) this request to that application server. Ideally this could be the application server with the least workload. But improvements are already achieved, if an application servers is selected with a workload below the average workload value. Referring to FIG. 2 for instance server (101) could have been selected. When the application server has finished processing of the application request, it sends an appropriate message (i.e. a processing response) back to the dispatcher. The dispatcher then sends the response back to the application. Or as an alternative the application server could send the response to the requesting application client directly.

A (message-based) application server runs under improved conditions if the number of application requests, i.e. the number of messages in the queue, is as small as possible. In fact, only one message needs to be in the queue when a member of a hot pool has finished work and wants to process a new message. Thus the current invention suggests that the dispatcher is selecting an application server based on an indication of its current workload. For instance the application server with the lowest workload is selected. In one embodiment the workload could be measured in terms of the number of outstanding application requests. Then that application server with the least number of messages in its input queue is selected to process the request; improvements are already achieved, if the an application servers is selected whose number of outstanding application requests is below an average. According to the current invention this information, i.e. indications of the workload of the application servers, is maintained by the dispatcher in a table (204). Since the dispatcher knows the number of messages sent to each of the application servers and received back from each application server it can administer such a table. However, the information that the dispatcher maintains may not be accurate. A method may be "poisoned" and cannot be processed by the application server and is routed to the administration component of the application server for further processing; or a certain application server might receive additional application requests from other sources. This situation can be overcome, by the application server returning (205) after processing each application request, i.e. with each response to an application request, the current number of messages in the queue (i.e. as indication of the current workload) and the number of members in the hot pool. This information can be easily be obtained by the members of the hot pool via appropriate queries to the message queuing system. Optionally an application server may also be responsive to poisoned application requests by sending the dispatcher an indication of its current workload; this behavior guarantees that in any case the dispatcher has the most up-to-date workload data available for its balancing decisions. Thus over this third port (203) the dispatcher server returns, after processing an application request, a response comprising an indication of its current workload. As indicated in FIG. 2 the first and third port of the dispatcher might be identical and represented by the dispatcher's input queue. Then the dispatcher uses this indication to update its table (204) accordingly; i.e. table (204) reflects an up-to-data representation of the activity pattern of the application servers supporting an improved workload balancing decision.

As an additional embodiment, it suggested that the dispatcher could try to minimize the number of messages in the queues of the application servers. That means, the dispatcher would only send messages if there is actually a need for it. By keeping the number of outstanding application requests within the individual application servers as low as possible the burden of its administration at the application servers can be reduced. This approach however works only if the application server is not controlled by a workload management system that activates and deactivates members of the hot pool based on the number of messages in the input queue. Thus, according to this embodiment the dispatcher stores, instead of sending the extracted application request to a certain application server, the application request to a buffer, if the number of outstanding application requests of a certain application server is above a threshold value. Finally the dispatcher is actually sending the application request once the number of outstanding application requests of the certain application server falls below a threshold value. The buffer either being the request queue itself, in which case the extracted application request remains in the request-queue until it is actually sent to an application server. Or as an alternative the buffer may be separate from the request queue to reduce the load within the messaging system.

Figure 3:
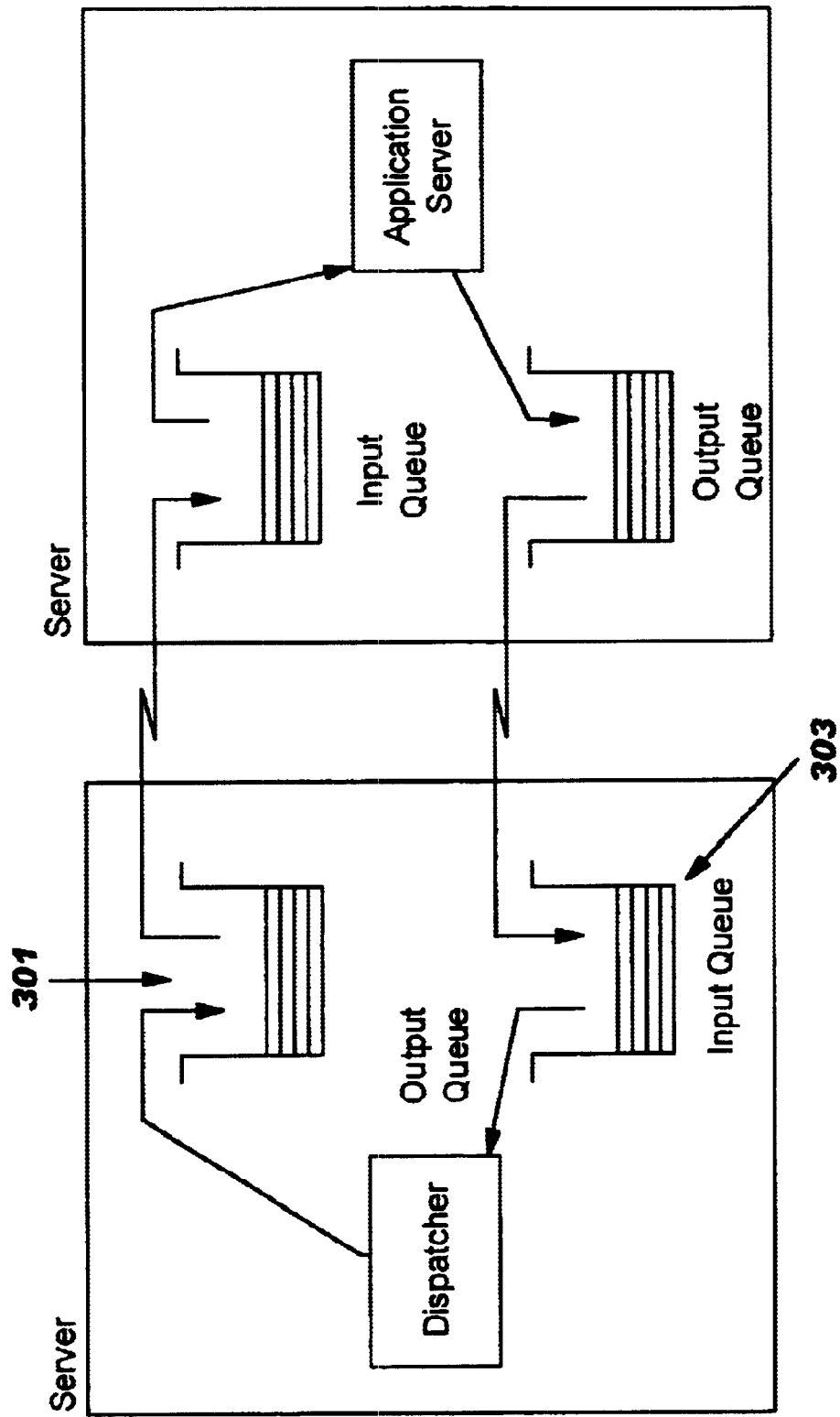
FIG. 3 visualizes that instead of a homogeneous messaging system between the dispatcher and application servers also a multitude of different messaging systems could be used and still allow implementation of the current invention.

When the different application servers use different implementations of message queuing systems (different APIs), the dispatcher can automatically take care of this by issuing the proper API calls. FIG. 2 shows the dispatcher using a remote API to put messages into the application server's input queue. A similar remote API would be used to retrieve the response message generated by the application server. FIG. 3 shows how the same behavior can be achieved if the message queuing system does not support remote APIs. Then in this case two dedicated queues between the dispatcher and an application server have to be created; a first queue (301) to send requests from the dispatcher to the application server and a second queue (303) to receive responses from the application server by the dispatcher. Of course the dispatcher could use for each application server a different messaging system for communication.

As a further improvement it suggested that the proposed methodology is executed under transaction protection. For that purpose the processing of an application request is executed within three transactions plus two transactions for inserting an application request and retrieving an application response by an application client:

Transaction A is performed by the application client inserting an application request message into the dispatcher's request queue.

Transaction 1 is performed by the dispatcher and consists of reading the request message and generating the request message for the application server.

Transaction 2 is performed by a member of the application server hot pool and consists of reading the request message, performing the appropriate operations such as updating databases, and generating the response message.

Transaction 3 is performed by the dispatcher and consists of reading the response message of the application server, administering the table (204) and optionally generating the response message for the application client.

Transaction B is performed by the application client retrieving an application response from an application server to an application request.

What is claimed is:

1. A method of workload balancing for a multitude of applications servers, said method comprising the steps of:

sending, by an application client, an application request to a request queue of a dispatching server, extracting, by said dispatching server, an application request from said request queue wherein:

said dispatching server is selecting a certain one of said application servers to which said extracted application request is to be sent to based on a table, said table being administered by said dispatching server and said table comprising an indication of workload of said application servers, said dispatching server administering said table according to said selection, and said dispatching server sending said extracted application request to said certain application server, wherein:

said dispatching server is storing, instead of sending said extracted application request to said certain application server, said extracted application request to a buffer, if the number of outstanding application requests of said selected application server is above a threshold value, and said dispatching server is actually sending said application request once said number of outstanding application requests falls below said threshold value said buffer either being said request queue itself or being separate from said request queue, and returning to said dispatching server, by an application server after processing an application request, a response comprising an indication of its current workload, wherein said dispatching-server is administering said table according to said response.

2. A method of workload balancing according to claim 1, wherein as indication of the workload of said application servers, the number of outstanding application requests for said application servers is used.

3. A method of workload balancing according to claim 2, wherein said dispatching server is selecting an application server as said certain application server, whose number of outstanding application requests is below an average value.

4. A method of workload balancing according to claim 3, wherein said dispatching server is selecting an application server as said certain application server, whose number of outstanding application requests is lowest.

5. A method of workload balancing according to claim 1, wherein in said sending, extracting and returning steps are executed as separate transaction under transaction protection.

6. A method of workload balancing according to claim 1 wherein said application servers comprise a hot pool of one or a multitude of application instances, being executed in the same or a multitude of address spaces.

7. A computer program product stored on a computer usable medium, comprising computer readable program means for causing a computer to perform a method according to claim 1.

8. A computer system acting as a dispatching server for application requests requesting service from a multitude of applications servers said dispatching server, said applications servers and at least one application client being connected by a network, wherein said dispatching server comprising a first port for receiving from said application client an application request, said dispatching server further comprising a table being administered by said dispatching server, said table comprising an indication of the workload of said application servers, said dispatching server using said table for selecting a certain one of said application servers and administering said table according to said selection, said dispatching server comprising a second port for sending said application request to said certain application server, wherein:

said dispatching server is storing instead of sending said extracted application request to said certain application server, said extracted application request to a buffer, if the number of outstanding application requests of said selected application server is above a threshold value, and said dispatching server is actually sending said application request once said number of outstanding application requests falls below said threshold value, said buffer either being said request queue itself or being separate from said request queue, said dispatching server comprising a third port over which an application server after processing an application request returning to said dispatching server a response comprising an indication of its current workload, and said dispatching server being susceptible to said response by administering said table accordingly.

9. A dispatching server according to claim 8, wherein as indication of the workload of said application servers the number of outstanding application requests for said application servers is used.

10. A data processing program for execution in a data processing system comprising software code portions for performing workload balancing for a multitude of applications servers, said data processing program comprising:

data processing means for sending, by an application client, an application request to a request queue of a dispatching server, data processing means for extracting, by said dispatching server, an application request from said request queue wherein:

said dispatching server is selecting a certain one of said application servers to which said extracted application request is to be sent to based on a table, said table being administered by said dispatching server and said table comprising an indication of workload of said application servers, said dispatching server administering said table according to said selection, and said dispatching server sending said extracted application request to said certain application server, wherein:

said dispatching server is storing instead of sending said extracted application request to said certain application server, said extracted application request to a buffer, if the number of outstanding application requests of said selected application server is above a threshold value, and said dispatching server is actually sending said application request once said number of outstanding application requests falls below said threshold value, said buffer either being said request queue itself or being separate from said request queue, and data processing means for returning to said dispatching server, by an application server after processing an application request, a response comprising an indication of its current workload, wherein said dispatching-server is administering said table according to said response.

11. A data processing program for workload balancing according to claim 10, wherein as indication of the workload of said application servers, the number of outstanding application requests for said application servers is used.

12. A data processing program for workload balancing according to claim 11, wherein said dispatching server is selecting an application server as said certain application server, whose number of outstanding application requests is below an average value.

13. A data processing program for workload balancing according to claim 12, wherein said dispatching server is selecting an application server as said certain application server, whose number of outstanding application requests is lowest.

14. A data processing program for workload balancing according to claim 10, wherein in said sending, extracting and returning steps are executed as separate transaction under transaction protection.

15. A data processing program for workload balancing according to claim 10, wherein said application servers comprise a hot pool of one or a multitude of application instances, being executed in the same or a multitude of address spaces.

* * * * *